(12) United States Patent
Buchzik et al.

(10) Patent No.: US 9,346,360 B2
(45) Date of Patent: May 24, 2016

(54) MOTOR VEHICLE ELECTRICAL SYSTEM AND METHOD FOR OPERATING A MOTOR VEHICLE ELECTRICAL SYSTEM

(75) Inventors: Oliver Buchzik, Gifhorn (DE); Mathias Hommel, Gifhorn (DE)

(73) Assignee: VOLKSWAGEN AG, Wolfsburg (DE)

( * ) Notice: Subject to any disclaimer, the term of this patent is extended or adjusted under 35 U.S.C. 154(b) by 412 days.

(21) Appl. No.: 13/702,615

(22) PCT Filed: Jun. 14, 2011

(86) PCT No.: PCT/EP2011/002903
§ 371 (c)(1),
(2), (4) Date: Dec. 7, 2012

(87) PCT Pub. No.: WO2011/160783
PCT Pub. Date: Dec. 29, 2011

(65) Prior Publication Data
US 2013/0082523 A1 Apr. 4, 2013

(30) Foreign Application Priority Data

Jun. 26, 2010 (DE) .................. 10 2010 025 198

(51) Int. Cl.
*B60L 1/00* (2006.01)
*B60L 11/18* (2006.01)

(52) U.S. Cl.
CPC . *B60L 1/00* (2013.01); *B60L 1/003* (2013.01); *B60L 11/18* (2013.01); *B60L 11/1868* (2013.01); *B60L 2210/12* (2013.01); *Y02T 10/7005* (2013.01); *Y02T 10/7066* (2013.01); *Y02T 10/7233* (2013.01)

(58) Field of Classification Search
CPC .. B60R 16/03; B60R 16/0315; B60R 21/017; Y02T 10/7005; H02J 1/00; H02J 7/1438
USPC .......................................... 307/10.1
See application file for complete search history.

(56) References Cited

U.S. PATENT DOCUMENTS 5,532,572 A * 7/1996 Okamura ....................... 320/166
5,783,872 A * 7/1998 Blair ............................... 307/46

(Continued)

FOREIGN PATENT DOCUMENTS

| DE | 102007052750 A1 | 5/2009 |
|---|---|---|
| EP | 2065268 A1 | 6/2009 |
| JP | 09233830 | 9/1997 |

OTHER PUBLICATIONS

Office Action for Chinese Patent Application No. 2011800315152.
(Continued)

*Primary Examiner* — Thienvu Tran
*Assistant Examiner* — Brian K Baxter
(74) *Attorney, Agent, or Firm* — Barnes & Thornburg LLP

(57) ABSTRACT

A motor vehicle electrical system having a DC-to-DC converter with a high-voltage side and a low-voltage side, wherein at least one traction battery is connected to the high-voltage side and electrical loads are connected to the low-voltage side, wherein the DC-to-DC converter can be switched on or woken up by a control signal of an electrical device, wherein the electrical device is arranged on the high-voltage side or is designed with an electrical energy store locally associated with the electrical device. Also disclosed is a method for operating such a motor vehicle electrical system.

17 Claims, 3 Drawing Sheets

(56) References Cited

U.S. PATENT DOCUMENTS

| | | | |
|---|---|---|---|
| 5,796,175 A | 8/1998 | Itoh et al. | |
| 5,838,137 A * | 11/1998 | Kim | 320/124 |
| 5,869,950 A * | 2/1999 | Hoffman et al. | 320/103 |
| 2002/0167291 A1* | 11/2002 | Imai et al. | 320/119 |
| 2004/0178756 A1* | 9/2004 | Zhenxing | 318/432 |
| 2008/0011528 A1* | 1/2008 | Verbrugge et al. | 180/65.2 |
| 2008/0271937 A1* | 11/2008 | King et al. | 180/165 |
| 2010/0000813 A1* | 1/2010 | Wagner | 180/65.265 |
| 2010/0117593 A1* | 5/2010 | Piccard et al. | 320/104 |
| 2010/0187904 A1* | 7/2010 | Lucas et al. | 307/10.1 |
| 2010/0231169 A1* | 9/2010 | Hashim et al. | 320/134 |
| 2011/0218698 A1* | 9/2011 | Bissontz | 701/22 |
| 2012/0261982 A1* | 10/2012 | Wanke et al. | 307/9.1 |

OTHER PUBLICATIONS

Search Report for International Patent Application No. PCT/EP2011/002903; Oct. 27, 2011.

* cited by examiner

MOTOR VEHICLE ELECTRICAL SYSTEM AND METHOD FOR OPERATING A MOTOR VEHICLE ELECTRICAL SYSTEM

PRIORITY CLAIM

This patent application is a U.S. National Phase of International Patent Application No. PCT/EP2011/002903, filed 14 Jun. 2011, which claims priority to German Patent Application No. 10 2010 025 198.4, filed 26 Jun. 2010, the disclosures of which are incorporated herein by reference in their entirety.

FIELD

Disclosed embodiments relate to an on-board motor vehicle electrical system and to a method for operating an on-board motor vehicle electrical system.

BACKGROUND

On-board motor vehicle electrical systems having a DC/DC converter with a high-voltage side and a low-voltage side, with at least one traction battery being connected to the high-voltage side and electrical loads being connected to the low-voltage side, are used, in particular, in hybrid or electric vehicles. However, in principle, arrangements of this kind can also be used in motor vehicles, with drive power being provided, for example, only by means of an internal combustion engine. In these cases too, the battery on the high-voltage side is currently called the traction battery. In the case of an on-board motor vehicle electrical system, the voltage on the low-voltage side is, for example, 12 V, while the voltage on the high-voltage side can be, for example, in the region of 300 V, 600 V or 750 V depending on the design of the system. In this case, the voltage level depends on the cell voltage of the battery cells used and the number of battery cells which are connected in series. The following applies for a predetermined drive power: the higher the output voltage of the traction battery is selected to be, the lower are the currents required to achieve the selected drive power. With lower currents, the cross sections of the electrical connections can be selected to be lower given the same or else similar line resistances. This generally leads to relatively low weight. A traction battery is a battery which stores energy for driving the motor vehicle and provides this energy during operation. In the case of a hybrid vehicle, this drive energy of the traction battery can also be used to assist driving, so that a further drive, for example a motorized drive, is available in parallel.

An on-board motor vehicle electrical system of this generic type is known, for example, from DE 10 2007 052 750 A1. Furthermore, the document discloses a method for starting a hybrid drive by means of an auxiliary energy source comprising the steps of: providing an electrical machine and an internal combustion engine which together are intended to generate kinetic energy in the hybrid drive; providing a traction battery for supplying traction energy to the electrical machine, an on-board electrical system for starting the internal combustion engine in the normal mode, and a converter control system of a DC/DC converter which is provided for supplying the on-board electrical system from the traction battery, with the on-board electrical system supplying the converter control system. If, in an emergency mode on account of an energy deficit in the on-board electrical system, there is not enough energy remaining in the on-board electrical system either to operate the converter control system or to start the internal combustion engine, an external auxiliary amount of energy is supplied to the converter control system, this auxiliary amount of energy being lower than the energy deficit, in order to at least briefly ensure operation of the converter control system; activating the DC/DC converter by actuation by means of the converter control system and feeding an amount of energy for a starting process, which originates from the traction battery, to the on-board electrical system by the DC/DC converter, this amount of energy, together with the energy remaining in the on-board electrical system, being sufficient to start the internal combustion engine, with the internal combustion engine being started by the transmission of rotational energy from the starter.

The known on-board motor vehicle electrical systems have a significant weight and installation space requirement on account of the traction battery, the DC/DC converter and the on-board electrical system battery on the low-voltage side which serves to supply the controllers.

SUMMARY

Disclosed embodiments provide an on-board motor vehicle electrical system and also a method for operating an on-board motor vehicle electrical system, so that, in particular, installation space and weight can be saved.

The technical problem is solved by the subjects having the features of patent claims 1 and 11. Further advantageous refinements of the disclosed embodiments can be found in the dependent claims.

To this end, the on-board motor vehicle electrical system comprises a DC/DC converter having a high-voltage side and a low-voltage side, with at least one traction battery being connected to the high-voltage side and electrical loads being connected to the low-voltage side, it being possible for the DC/DC converter to be switched on or woken up by a control signal of an electrical device, with the electrical device being arranged on the high-voltage side or being designed with an electrical energy storage means which is locally associated with the electrical device and by means of which at least the control signal can be generated. As a result, it is possible to supply the loads on the low-voltage side exclusively by means of the high voltage, which has been transformed down, of the traction battery, so that a battery on the low-voltage side can be dispensed with, this reducing the weight, installation space and costs. The electrical device may be in the form of a controller.

BRIEF DESCRIPTION OF THE DRAWINGS

The invention will be explained in greater detail below with reference to disclosed embodiments. In the figures.

DETAILED DESCRIPTION OF THE DISCLOSED EMBODIMENTS

Figure 1:
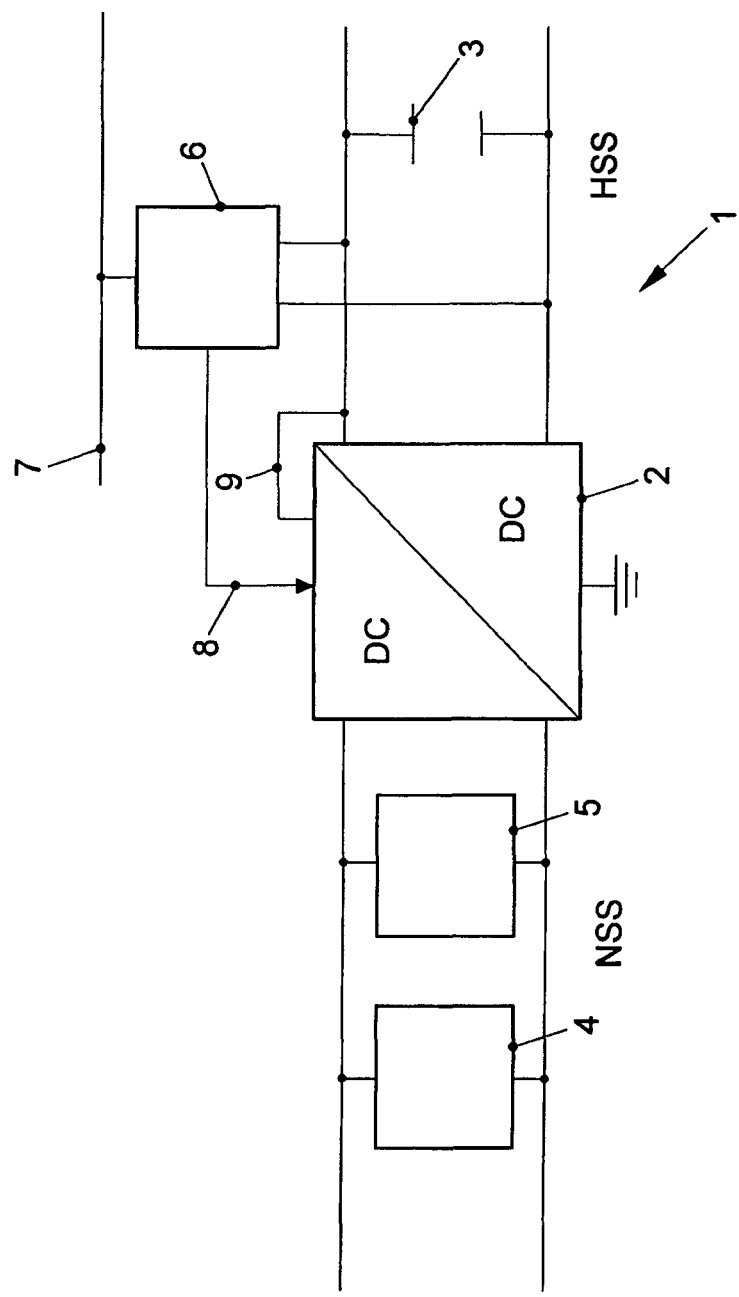
FIG. 1 shows an on-board motor vehicle electrical system in a first disclosed embodiment.

In at least one disclosed embodiment, the electrical device is arranged on the high-voltage side, with the DC/DC converter being supplied with voltage from the high-voltage side. This effects a very clear separation since the entire converter control and supply system is arranged on the high-voltage side. The supply voltage of the electrical device is usually lower than the voltage on the high-voltage side, and therefore the voltage has to be correspondingly reduced. If this is done, for example, by means of resistive voltage dividers, corresponding losses are incurred.

In at least one disclosed embodiment, the electrical device is arranged on the low-voltage side, with the electrical device being designed with a capacitor which is connected to a control line of the DC/DC converter by means of a switch, with the DC/DC converter being supplied with voltage from the high-voltage side. A signal which acts as a wake-up signal and wakes up the DC/DC converter can then be generated by closing the switch. The DC/DC converter can be in a switched-off state or an inoperative state with a low quiescent current or no quiescent current in order to save energy. The advantage of this arrangement is that of saving losses on the high-voltage side on account of voltage dividers or similar arrangements. In this case, it is only necessary to ensure that the capacitor can store sufficiently long charges so that the DC/DC converter can be guaranteed to be switched on or woken up even in the case of relatively long standby times. It is also possible to use other electrical energy storage means, for example rechargeable batteries, instead of the capacitor.

In a another disclosed embodiment, the electrical device is designed with a local energy storage means, with the local energy storage means supplying voltage to the DC/DC converter at least when the DC/DC converter is switched on. In this case, the local energy storage means can be considerably smaller than a customary on-board electrical system battery and is, for example, in the form of a multilayer electrolytic capacitor (supercap), electrochemical rechargeable battery or an electrochemical primary cell. This allows the electrical device to be arranged separately, so that changes or adjustments on the high-voltage side or low-voltage side are largely dispensed with.

After the DC/DC converter is switched on, voltage may be supplied to it by means of the high-voltage side or the low-voltage side, so that the local energy storage means is not too heavily discharged.

In yet another disclosed embodiment, the DC/DC converter is switched on by a network message, a signal or a manual switch. In this case, the network message can be generated, for example, by opening a vehicle door (manual opening or opening with a radio remote control signal or a central locking system) or a keyless entry signal of a central locking system.

In a further disclosed embodiment, the DC/DC converter is switched or switched off by a network message, a signal or a manual switch in a sleep mode (inoperative state with a low level of quiescent current consumption or no quiescent current consumption at all). This ensures that the electrical loads on the low-voltage side are also supplied with electrical energy after the ignition (terminal 15) is switched off.

In still another disclosed embodiment, the local energy storage means can be charged by the high-voltage side or the low-voltage side.

In yet another disclosed embodiment, the local energy storage means is charged in a predefinable time interval after the motor vehicle is turned off and/or during charging of the traction battery, it being possible for charging to also be periodically repeated after the motor vehicle is turned off. This ensures that the local energy storage means is always sufficiently charged in order to switch on or wake up the DC/DC converter. It is also possible for the DC/DC converter or another vehicle apparatus, for example a controller, to wake up from the inoperative state periodically or in predefined time profiles and to determine the voltage or the energy content of the local energy storage means and to charge the local energy storage means depending on the determined voltage or the determined energy content.

In a further disclosed embodiment, the voltage on the low-voltage side is raised before high current loads or peak current loads (high-current loads) which are arranged on the low-voltage side are switched on, in order to prevent voltage drops. By way of example, the voltage is raised from 12 V to 14 V. Examples of high-current loads are actuating motors, for example electromotive window winders or servo motors of an electromechanical steering system or else heating systems, such as a window heating system or a seat heating system, or else switch-on of the vehicle light.

The statements made in respect of the on-board motor vehicle electrical system apply in the same sense to the method for operating an on-board motor vehicle electrical system of this kind too.

FIG. 1 shows an on-board motor vehicle electrical system 1 in a first disclosed embodiment. The on-board motor vehicle electrical system 1 comprises a DC/DC converter 2 having a high-voltage side HSS and a low-voltage side NSS. In this case, the voltage level on the high-voltage side HSS is, for example, 48 V, 60 V or a few hundred volts (for example 300 V to 750 V depending on the design). The voltage level on the low-voltage side NSS is, for example, 12 V. A traction battery 3 is arranged on the high-voltage side HSS. The traction battery supplies drive energy for driving the vehicle, either in a supported manner, for example for acceleration processes, or else as the sole drive energy storage means. Electrical loads 4, 5 are arranged on the low-voltage side NSS. The electrical loads 4, 5 are, for example, controllers, electromechanical sensors and actuators, lamps, display screens, radio or navigation equipment etc. A controller 6 which receives its supply voltage from the high-voltage side HSS is arranged on the high-voltage side HSS. Furthermore, the controller 6 is connected to a bus system 7, for example a CAN or FlexRay bus. Finally, the controller 6 is connected to the DC/DC converter 2 by means of a control line 8. As an alternative or in addition, the DC/DC converter 2 can also be connected to the bus system 7. The DC/DC converter 2 is supplied with operating voltage by means of the high-voltage side HSS via a supply line 9. In this case, the electrical loads 4, 5 on the low-voltage side NSS are supplied with electrical energy exclusively by means of the DC/DC converter 2. The DC/DC converter 2 can be switched off or be in a sleep mode in the inoperative state of the on-board motor vehicle electrical system 1. If the controller 6 then detects a network message by means of the bus system 7 of the motor vehicle, for example from a keyless entry system, the DC/DC converter 2 is switched on or woken up via the control line 8, and therefore the electrical loads 4, 5 are ready to start the motor vehicle. Accordingly, the DC/DC converter 2 can be switched off again or switched to a sleep mode by means of a network message.

Figure 2:
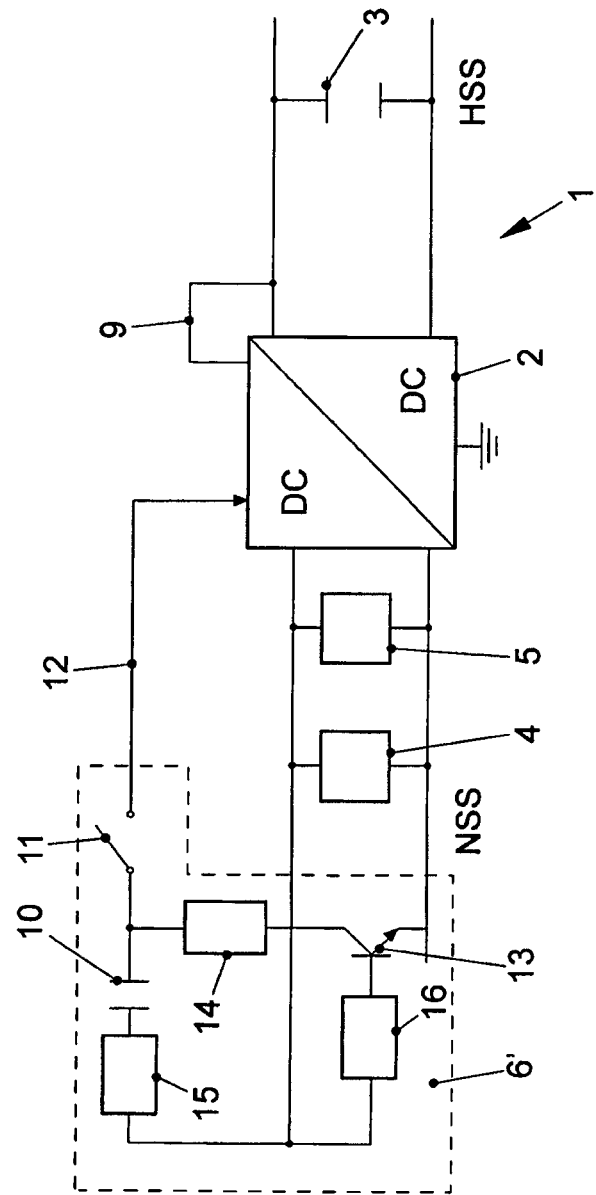
FIG. 2 shows an on-board motor vehicle electrical system in a second disclosed embodiment.

FIG. 2 shows another disclosed embodiment of an on-board motor vehicle electrical system 1, with identical elements to those in FIG. 1 being provided with the same reference symbols. The controller 6 is replaced by an electrical device 6' which is, for example, in the form of a controller or radio. The device 6' comprises a capacitor 10 which is connected to a control line 12 of the DC/DC converter 2 by means of a switch 11. In this case, this control line 12 can correspond to the control line 8 according to FIG. 1, but does not have to do so. In this case, it is assumed that, in the inoperative state, the DC/DC converter 2 is in the sleep mode and the capacitor 10 is charged. A current pulse flows via the control line 12 and wakes up the DC/DC converter 2 by the switch 11 being closed (manually or by a network message). The transistor 13 is then switched on by means of the voltage which is then applied on the low-voltage side, and therefore the capacitor 10 can be recharged. In this case, the resistors 14 to 16 are used to set the voltage level. The DC/DC converter 2 can actually be controlled after being woken up by means of the device 6' or another controller. In order to ensure that the capacitor 10 is always sufficiently charged to wake up the DC/DC converter 2, the capacitor may be periodically charged, depending on the quiescent current of the motor vehicle or depending on the residual charge of the capacitor 10. As in the disclosed embodiment according to FIG. 1, electrical energy is supplied to all the electrical loads 4, 5, 6' on the low-voltage side NSS exclusively by means of the DC/DC converter 2. There is no separate on-board electrical system battery.

Figure 3:
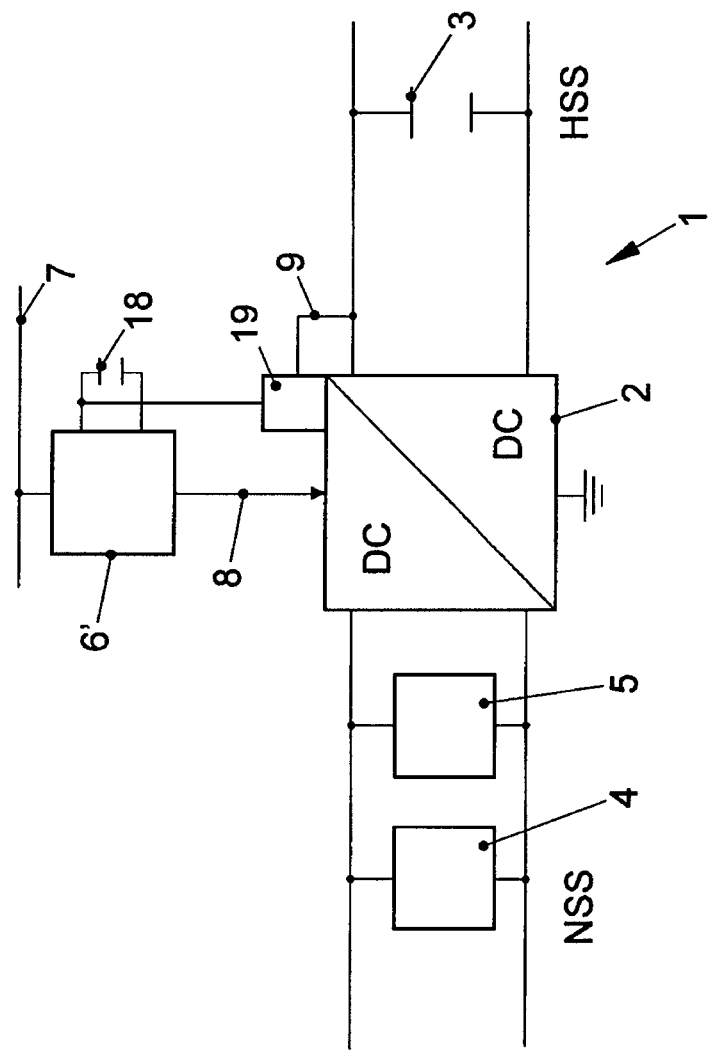
FIG. 3 shows an on-board motor vehicle electrical system in a third disclosed embodiment.

Finally, FIG. 3 shows a third disclosed embodiment of an on-board motor vehicle electrical system 1. The on-board motor vehicle electrical system 1 comprises a controller 6" having a local, electrical energy storage means 18 which is in the form of, for example, a rechargeable battery. The local energy storage means 18 is connected to the DC/DC converter 2 by means of a switching device 19. Similarly, the controller 6" is connected to the DC/DC converter 2 via a control line 8. The DC/DC converter 2 is switched off or in the sleep mode in the inoperative state. If the controller 6" then receives a corresponding network message by means of the bus system 7, the controller 6" supplies supply voltage to the DC/DC converter 2 by means of the local energy storage means 18 and switches on the DC/DC converter 2 via the control line 8. After the DC/DC converter 2 has been switched on, the switch device 19 makes a changeover to the voltage on the high-voltage side HSS as the supply voltage for the DC/DC converter 2 and additionally may charge the local energy storage means 18. As an alternative, the local energy storage means 18 can be charged and/or the voltage can also be supplied to the DC/DC converter 2 by means of the low-voltage side NSS. In this disclosed embodiment too, all the electrical loads 4, 5 on the low-voltage side NSS are supplied with electrical energy by means of the DC/DC converter 2.

LIST OF REFERENCE SYMBOLS

1 On-board motor vehicle electrical system
2 DC/DC converter
3 Traction battery
4, 5 Electrical loads
6, 6', 6" Electrical device, controller
7 Bus system
8 Control line
9 Supply line
10 Capacitor
11 Switch
12 Control line
13 Transistor
14-16 Resistors
18 Local energy storage means
19 Switch device
HSS High-voltage side
LSS Low-voltage side

The invention claimed is:
1. An on-board motor vehicle electrical system comprising:
a DC/DC converter with a high-voltage side and a low-voltage side;
at least one traction battery being connected to the high-voltage side; and
electrical loads connected to the low-voltage side powered exclusively by the at least one traction battery,
wherein the DC/DC converter is turned on by a control signal generated by an electrical device having electrical energy storage means which is locally associated with the electrical device which generates at least the control signal,
wherein the electrical device is designed with a local energy storage means, with the local energy storage means supplying the voltage to the DC/DC converter at least when said DC/DC converter is turned on, and
wherein the local energy storage means is charged in a predefinable time interval after the motor vehicle is turned off and/or during charging of the traction battery.

2. The on-board motor vehicle electrical system of claim 1, wherein the electrical device is included in the system and is arranged on the high-voltage side and the DC/DC converter is supplied with a voltage from the high-voltage side.

3. The on-board motor vehicle electrical system of claim 2, wherein the electrical device is turned on in response to receipt of a network message or operation of a manual switch.

4. The on-board motor vehicle electrical system of claim 1, wherein the electrical device is included in the system and is arranged on the low-voltage side, with the electrical device having a capacitor connected to a control line of the DC/DC converter by a switch, with the DC/DC converter being supplied with the voltage from the high-voltage side.

5. The on-board motor vehicle electrical system of claim 1, wherein the voltage is supplied to the DC/DC converter on the high-voltage side or the low-voltage side in response to the DC/DC converter being turned on.

6. The on-board motor vehicle electrical system claim 1, wherein the DC/DC converter is turned on or off in response to receipt of a network message or operation of a manual switch while the DC/DC converter is in a sleep mode.

7. The on-board motor vehicle electrical system of claim 1, wherein the local electrical energy storage means is charged by the high-voltage side or the low-voltage side.

8. The on-board motor vehicle electrical system claim of claim 1, wherein the voltage on the low-voltage side is raised before high current loads or peak current loads are switched on.

9. A method for operating an on-board motor vehicle electrical system that includes a DC/DC converter with a high-voltage side and a low-voltage side, at least one traction battery connected to the high-voltage side and electrical loads connected to the low-voltage side powered exclusively by the at least one traction battery, the method comprising:
turning on the DC/DC converter in response to a control signal generated by an electrical device, with the electrical device, being arranged on the high-voltage side or including an electrical energy storage means which is locally associated with the electrical device, generates at least the control signal,
wherein the local energy storage means is charged in a predefinable time interval after the motor vehicle is turned off and/or during charging of the traction battery.

10. The method of claim 9, wherein the electrical device is included in the system and is arranged on the high-voltage side and the DC/DC converter is supplied with the voltage from the high-voltage side.

11. The method of claim 10, wherein the electrical device is turned on in response to receipt of a network message or operation of a manual switch.

12. The method of claim 9 wherein the electrical device is included in the system and is arranged on the low-voltage side, with the electrical device having a capacitor connected to a control line of the DC/DC converter by a switch, and wherein the DC/DC converter is supplied with the voltage from the high-voltage side.

13. The method of claim 9, wherein the electrical device is designed with a local energy storage means, with the local energy storage means supplying the voltage to the DC/DC converter at least when said DC/DC converter is turned on.

14. The method of claim 13, the voltage is supplied to the DC/DC converter on the high-voltage side or the low-voltage side in response to the DC/DC converter being turned on.

15. The method of claim 13, further comprising charging the local electrical energy storage means by the high-voltage side or the low-voltage side.

16. The method of claim 9, wherein the DC/DC converter is turned on or off in response to receipt of a network message or operation of a manual switch while the DC/DC converter is in a sleep mode.

17. The method of claim 9, further comprising raising the voltage on the low-voltage side before high current loads or peak current loads are switched on.

* * * * *